United States Patent [19]
Johnson

[11] 3,897,568

[45] July 29, 1975

[54] PROCESS AND COMPOSITIONS FOR MANUFACTURE OF YEAST-RAISED PRODUCTS WITHOUT FERMENTATION

[75] Inventor: John A. Johnson, Manhattan, Kans.

[73] Assignee: Kansas State University Research Foundation, Manhattan, Kans.

[22] Filed: Aug. 2, 1973

[21] Appl. No.: 385,167

[52] U.S. Cl. ............... 426/23; 426/25; 426/152; 426/208; 426/212; 426/226
[51] Int. Cl. .......................................... A21d 2/24
[58] Field of Search ......... 426/23, 25, 19, 152, 212, 426/226, 65, 175, 208

[56] References Cited
UNITED STATES PATENTS

| | | | |
|---|---|---|---|
| 2,434,087 | 1/1948 | Weber | 426/23 |
| 2,564,763 | 8/1951 | Kass | 426/23 |
| 3,053,666 | 9/1962 | Henika | 426/23 |
| 3,309,203 | 3/1967 | Jensen | 426/23 |
| 3,655,403 | 4/1972 | Vidal | 426/23 |

Primary Examiner—Joseph M. Golian

[57] ABSTRACT

Yeast-raised products are prepared without standard fermentation by incorporating in the flour dough mix a fermentation compensator composition comprising substantially completely hydrolyzed gluten protein, preferably wheat gluten, together with a mixture of food acceptable organic acids, including principally acetic acid and lactic acid, and preferably also $C_4$ to $C_6$ monocarboxylic acids. The respective levels and relative proportions of the amino acid mixture and the organic acid mixture are critical for producing baked products having at least as good flavor and physical properties as when the dough mix is fermented. The organic acids may be in the form of dry salts thereof, and this form is preferred for preparing a dry mixture with gluten amino acids for composite blending into a flour yeast dough. The gluten hydrolyzate and the organic acid salts can be premixed with baking flour for later preparation of yeast-raised products.

18 Claims, No Drawings

PROCESS AND COMPOSITIONS FOR MANUFACTURE OF YEAST-RAISED PRODUCTS WITHOUT FERMENTATION

BACKGROUND OF THE INVENTION

The baking of bread from yeast and flour is an ancient art. Although recipes and baking techniques have varied, the almost universal practice has been to subject all, or at least part, of the flour to fermentation in the presence of the yeast, form the fermented dough into loaves, and bake them under temperature conditions resulting in a brown crust. Yeast breads prepared in this manner have a characteristic aroma and taste, often referred to generically as "bread flavor". These features of the art of bread baking have carried over to the large-scale commercial manufacture of yeast-raised products.

In the United States, by far the largest volume commercial bread product is referred to as standard pan bread. It is estimated that around 65% of pan bread is produced by the "sponge dough" process, although some bakeries still use the older straight dough process. Both processes involve at least three to four hours of fermentation. In the sponge process, roughly two thirds of the flour and water are mixed with the yeast to form the "sponge" which is permitted to work and ferment under favorable temperature conditions for several hours, typically about 4 hours. In the straight dough process, all of the flour and water and other ingredients are combined with the yeast, and held under favorable temperatures for fermentation for at least 3 to 4 hours. In both processes after the completion of the fermentation and in the sponge process, also after the addition of the rest of the flour and water and other ingredients, the fermented dough is formed into loaves, commonly referred to as the dough being "panned". After the dough make-up stage, the loaves are held in a warm moist atmosphere room to permit the loaves to rise. In the terminology of the baking industry, this step is referred to as "proofing". Typical conditions are a temperature of 100°F., 80–90% relative humidity, and a holding or proofing time of 45 minutes to 1 hour. Following the completion of proofing, the bread is baked in ovens with temperature conditions producing brown crust formation with a soft white interior. In technical articles on bread baking, the interior of the loaves is referred to as the "crumb" to distinguish it from the crust, since the crust and crumb, respectively, have been found to have different physical properties and to have a different chemical makeup.

Other yeast-raised products, including products such as Vienna, French, and rye breads, all types of rolls, crackers, etc., are made by somewhat varying manufacturing procedures, but substantially all yeast-raised products produced in the United States at the present time do involve a separate fermentation stage, the fermentation holding time varying from 2 to 24 hours, and averaging at least 3 or 4 hours. It has long been desired to eliminate or at least substantially reduce such dough fermentation. Not only does the fermentation stage extend the length of the process with increased material losses, but it also requires the use of additional equipment and manufacturing space. Labor costs are also involved, since the necessity of dough fermentation is the main reason that bakers come to work at early hours in the morning. Of course, bread can be prepared without prefermentation, but the problem is one of sacrificing quality, the resulting deficiencies being generally referred to as a lack of bread flavor. In particular, bread aroma and taste are believed to be adversely affected, and there are also usually observable adverse effects on physical properties of the crumb, such as less resiliency, and poor texture and grain. Since the term bread flavor as used herein and in connection with bread manufacture and research, refers to a complex of aroma and taste characteristics, it can to some extent be subject to the vagaries of personal preference. However, it is possible to make sure organoleptic valuations by scientifically designed studies of consumer preference. Further, there has been a very large amount of work done on the chemical modifications of dough occuring during fermentation and baking. It has been conclusively demonstrated that the chemical makeup of baked bread, particularly of the crust, is different when bread is baked without the standard prefermentation.

The chemistry of dough fermentation is highly complex and not fully understood. As a flour dough ferments, a number of enzymatic reactions occur. The gluten protein is partially hydrolyzed to peptides and amino acids which react with reducing sugars at elevated baking temperatures. Soluble starch is converted to dextrins and maltose which may be further metabolized by yeast or react with the free amino acids during baking. The bacteria associated with the yeast and flour produces mainly lactic and acetic acid but also traces of the $C_4$ to $C_6$ monocarboxylic organic acids. The ethyl alcohol and carbon dioxide and many of the carbonyl compounds of fermentation are subsequently dissipated during remix and baking at elevated temperatures.

A summary of the existing knowledge of the chemistry of bread flavor, particularly in relation to the changes produced by fermentation in baking, is presented in *Flavor Chemistry*, Hornstein, editor, Chap. 9, pages 153–172 (A.C.S., 1966). As this article points out: "The extremely complex nature of bread flavor is illustrated by the fact that more than 70 compounds have been identified or implicated." These include some 23 organic acids isolated from preferments, doughs, or breads, 5 or 6 alcohols, 24 to 25 carbonyl compounds (aldehydes and ketones), and 6 to 8 esters of organic acids. The chemistry of bread flavor is further complicated by the reactions which occur during browning of the crust. As pointed out in the cited article, the predominant browning action is accepted to be the so-called Maillard-type browning, which involves reactions between free amino groups and reducing sugars. Although extensive tests are reported in the literature, involving modifications of fermentation time, and the addition of some of the compounds formed during fermentation, such as organic acids and/or amino acids, and it has been found, in some cases, that the flavor of the baked product can be appreciably changed, the achievement of the total aroma and taste, comprising the classical "bread flavor" has not been achieved without substantial prefermentation of all or part of the flour. The state of the art in 1966 and today, as summarized in the cited treatise, is that "both fermentation and baking are essential" for achieving true bread flavor. Acceptable physical properties must also be achieved and it is not known how this can be done without fermentation.

The general assumption of the art that yeast fermentation of the dough is essential to developing an acceptable bread flavor and physical properties has been particularly challanged and put to the test in connection with modern continuous bread baking processes. In such processes for obvious reasons of efficiency, there is an extremely strong incentive to eliminate prefermentation, all of the ingredients being fed continuously into the process, and continuously processed without appreciable holdup up to the proofing stage. For example, all ingredients are metered and blended together at an incorporator on a continuous basis. The ingredients include the fermented yeast slurry, sugar, salt, milk, flour, oxidants and shortening.

In England, a continuous bread baking process has been developed, which is known as the Chorleywood Bread Process. At least in some embodiments, this process is practiced in Great Britain without any prefermentation. See Elton, *Baker's Dig.* 39(4):38(1965). However, the Chorleywood Process is designed to produce a "Cottage loaf" which is quite different from American pan bread. The texture is different than prefermentation pan bread, being relatively firm and open. Further, it is necessary to use a special mixer (a "Tweedy type" mixer), and to use relatively large amounts of oxidants. Nevertheless, the bread is very bland in taste, does not have a rich full bread aroma, and fails to achieve the generally desired full bread flavor.

In the United States, continuous bread baking processes, as practiced commercially, have involved the use of a "preferment" procedure. At the present time, as much as a third of the standard pan bread is estimated to be produced in the United States by continuous process using a preferment. In this procedure, a preferment is prepared from yeast, water, yeast food and sometimes up to 50% of the flour. After 2–4 hours fermentation, the preferment is metered into the main line and to this is metered solutions of sugar, salt, oxidants, and shortening. The flour is metered to other ingredients at the incorporator. The dough is pumped from the incorporator to the dough development mixer from where it is panned directly, proofed and baked in a customary manner.

There have been proposals that the use of the preferment be eliminated in continuous mix processes. See Redfern et al, *Cereal Science Today*, Vol. 13, pages 324 (September, 1968). Nevertheless, such suggestions have had little effect on the practical art of bread baking in the United States by the continuous process. The industry has continued to operate on the basis that acceptable bread flavor and physical properties cannot be obtained without prefermentation, and has therefore continued to use 2–4 hour preferments in continuous processes despite the clear advantages of entirely eliminating this step, or at least reducing the holding time of the preferment.

Protein hydrolyzates, including amino acid hydrolyzates and partial hydrolyzates, have been proposed for incorporation in bread dough. (See U.S. Pat. Nos. 2,434,087, 3,391,001 and 3,655,403; and Rooney et al. *Cereal Chem.* 44:539). Such hydrolyzates have been claimed to improve properties of the yeast-raised products, such as physical properties, aroma, and flavor. It has not been claimed that fermentation holding of the dough mix could be eliminated by using natural mixtures of free amino acids. U.S. Pat. No. 3,309,203 proposes the use of a specific amino acid, methionine, for reducing fermentation time in making leavened bread and bread-like products, but the fermentation holding period is merely reduced and not eliminated. Further, amounts of methionine are specified in the range of 0.1 to 5 grams per 100 pounds of flour. U.S. Pat. No. 3,594,180 proposes that organic acids in combination with oxidizing agents may be added to yeast dough mixes for the purpose of eliminating dough fermentation. As far as is known, none of these proposals has been accepted, and none has gone into commercial use. The literature approaches to intensifying bread flavor were reviewed in 1967 by John A. Johnson and Ahmed El-Dash: *Bakers' Digest*, Vol. 44, No. 5, pp. 74–78. These included: (1) the collection, analysis and synthetic simulation of vapors evolved during bread baking; (2) the search for the addition of flavor precursors to bread dough (viz. amino acids); and (3) the study of the effects of protease enzymes on bread dough.

DESCRIPTION OF THE INVENTION

The method and compositions of the present invention can be utilized for improving any of the standard bread baking processes now being practiced commercially in the United States, including the sponge dough process, the straight dough process, and the continuous process. These processes are utilized primarily for the manufacture of loaves of bread, but corresponding processes are used for manufacturing other yeast dough products, such as rolls, crackers, pizza dough, sweet dough, etc. Consequently, the step referred to as panning where the dough is shaped and formed into the final products should be understood as including not only standard bread loaf shapes, but other shapes such as those of rolls and crackers. In general, a flour yeast dough mix is formed into dough bodies of a size and shape for baking, and the dough bodies are baked with brown crust formation.

The main ingredients for forming such yeast-raised products are well known. Usually, they include principally wheat flour, or wheat flour including a small amount of other edible baking flour, such as rye flour or soy bean flour. The other principal ingredients are yeast, salt and water. In addition, shortening and sugar are usually part of the formulation. Other minor ingredients include mineral yeast food to activate the yeast, oxidants, preservatives, and enzymes. The present invention does not require any specific yeast dough formulation, but is generally applicable to yeast flour doughs of kinds which are normally subjected to prefermentation before baking. Usually, the prefermentation is carried out prior to panning and proofing.

The present invention provides a method of substantially eliminating the present standard holding stage for the dough mix, or portion thereof, such as the dough sponge or preferment, before forming the dough mix into dough bodies. For example, bread can be prepared from a flour yeast dough mix which is formed into loaves ready for proofing in less than one hour after formation of the dough mix. By incorporating a mixture of amino acids and organic acids in certain critical proportions, the baked products prepared without fermentation holding will have at least as good flavor and physical properties as when standard prefermentation procedures are employed.

In practicing the method improvement of the present invention, a hydrolyzate of wheat gluten protein is incorporated in the dough mix as it is prepared. The wheat gluten protein is in substantially fully hydrolyzed form, that is, being composed essentially of the mixture of the individual natural amino acids of wheat gluten protein. In addition to the mixture of individual amino acids derived from wheat gluten, a mixture of food acceptable organic acids are incorporated in the dough as it is prepared. The principal component of the organic acid mixture is acetic acid, lactic acid, or mixtures of acetic and lactic acid. Other organic acids are preferably included, namely, a mixture of the monocarboxylic acids containing from 4 to 6 carbon atoms.

The combination of the gluten amino acids and the mixture of organic acids functions as a fermentation compensator, that is, the combination compensates for or provides the changes in the dough mix which normally require fermentation to achieve. No special method of incorporating the amino acids and organic acids is required. The gluten hydrolyzate and the organic acids may be added separately, or may be premixed for simultaneous addition, and may be formulated either as a liquid solution, or as a dry mix when the organic acids are in salt form. It is preferred to prepare the complete fermentation compensator composition in the form of a dry mix, which can be conveninetly blended into the dough. In general, the gluten hydrolyzate and organic acids can be mixed into the dough at any time before they are panned or otherwise formed into dough bodies for baking. In a preferred procedure, the gluten hydrolyzate and organic acids or salts thereof are incoporated at the time the baking flour, water, and yeast are initially mixed.

In preparing the amino acid hydrolyzate for use in the method and compositions of this invention, it is preferred to utilize purified wheat gluten protein. Wheat gluten provides the optimum ration of amino acids for producing full bread flour. The gluten protein is desirably low in carbohydrates, since carbohydrates, when present, can react with the amino acids during their preparation by hydrolysis to produce a lower yield of the free amino acids. Suitable purified wheat gluten protein (85–90% protein, 5–10% carbohydrate) is available commercially. The purified gluten protein can be hydrolyzed under pressure with the inorganic acid, such as hydrochloric acid, neutralized, purified by carbon treatment, and dried to a powder. Preferably, the conditions for the hydrolysis are such that substantially all of the gluten protein is hydrolyzed to the amino acid stage. For example, at lest 90% and preferably 95 to 100% of the amino acids should be present in the hydrolyzed product as individual amino acids. The salt formed during neutralization, such as sodium chloride, when sodium hydroxide is used to neutralize the hydrochloric acid, need not be removed. The salt thus added does not cause any problem, the amount added to the dough with the amino acids being relatively innsignificant, even though the salt forms from 40–50% of hydrolysis product. For example, the hydrolyzate may comprise 40–44% NaCl, 38–40% amino acids, and the balance being water and non-protein material.

The amount of the natural mixture of gluten amino acids incorporated in the dough should be precisely controlled in relation to the amount of flour in the dough. Further, the proper amount of the amino acids to be employed is related to their use in combination with a specified level of the organic acids. It has been discovered that while the aroma and flavor of the baked products can be intensified by incorporating amounts of amino acids in the range of 0.3 to 0.8% by weight based on the weight of the flour (14% moisture basis) that the resulting baked products are unacceptable, having a bitter-cheesy flavor and aroma. However, it has been further discovered that when the amount of added gluten amino acids are not over 0.20% by weight based on the weight of the flour (14% M.B.) and preferably limited to 0.15% by weight of lower, then a significant improvement in overall flavor can be obtained as compared with the elimination of prefermentation without incorporation of the gluten hydrolyzate. As compared with the same type of yeast-raised dough product prepared with standard prefermentation, the products containing the limited amount of added gluten hydrolyzate are somewhat deficient in aroma and overall flavor. The principal discovery of the present invention, therefore, is that it is necessary to use organic acids in combination with a limited amount of gluten hydrolyzate in order to achieve comparable bread aroma and flavor.

The interrelation of the amounts of amino acid and organic acids is further complicated by the fact that the physical properties of the bread, as distinguished from the flavor properties, are not necessarily optimized at the same time and in the same way as the flavor properties. For example, it has been found that the addition of gluten hydrolyzate to dough mixes does not in itself significantly improve physical properties such as texture, grain, symmetry, etc. However, when the organic acids are added at a level which in combination with the added gluten hydrolyzate achieves substantially as good or better flavor properties as with prefermentation, the physical properties of the baked products are also improved, achieving baked products having not only as good flavor properties but also as good physical properties without prefermentation as when standard prefermentation is employed.

In practicing the present invention, the mixture of food acceptable organic acids incorporated in the dough togehter with the mixture of amino acids should provide from 1 to $10 \times 10^{-4}$ moles total acid for each 700 grams of flour (14% M.B.). This amount of acids can be employed in combination with an amount of the amino acids of from 0.02 to 0.20% based on the weight of flour (14% M.B.), or preferably from 0.03 to 0.15% amino acids. For optimizing the improvement of the present invention from 2 to $9 \times 10^{-4}$ moles of total organic acids for each 700 grams flour (14% M.B.) can be employed in combination with from 0.03 to 0.15% by weight amino acids based on the weight of the flour (14% M.B.).

The principal component of the organic acid mixture should be acetic acid, lactic acid or mixtures of acetic and lactic acid, or salts thereof. Preferably, a mixture of acetic and lactic acid is employed. The relative proportions of acetic acid and lactic acid may be varied, such as from 1 to 3 moles of acetic acid to each mole of lactic acid to 1 to 3 moles of lactic acid to each mole of acetic acid. In a desirable embodiment, approximately equal molar proportions of acetic and lactic acid are used. In general, the amount of acetic acid, lactic acid, or mixture of acetic and lactic acid incorporated in the dough should be sufficient to reduce the pH of the dough to the range of 5.0 to 5.6, such as about pH 5.4.

For achieving the desired combination of comparable flavor properties and physical properties, the organic acid mixture desirably includes a minor proportion of monocarboxylic acids containing from 4 to 6 carbon atoms. Butyric and isobutyric acids are particularly desirable and may advantageously be used in combination with other $C_4$ to $C_6$ organic acids such as valeric acid, isovaleric acid, and hexanoic acid. Specifically, the $C_4$ to $C_6$ monocarboxylic acids can comprise from 5 to 30 mole percent of the organic acid mixture, the remaining 70 to 95 mole percent of the mixture comprising acetic and/or lactic acid. In a preferred embodiment, the $C_4$ to $C_6$ monocarboxylic acids are present in the organic acid mixture in an amount of from 7 to 20 mole percent together with 80 to 93 mole percent of acetic acid and/or lactic acid. It is believed desirable to have at least three different ones of the monocarboxylic acids present, for example, butyric acid, isobutyric acid, and one other acid selected from valeric, isovaleric, and hexanoic acid. Monocarboxylic acids may be used in approximately equal molar proportions, but the molar ratios can vary from at least 1 mole of the monocarboxylic acid present in the lowest proportion to 3 moles of the monocarboxylic acid present in the greatest proportion. For example, the $C_4$ to $C_6$ monocarboxylic acid may be combined in proportions of from 2 to 4 moles butyric, 2 to 4 moles isobutyric, and 0.5 to 1.5 moles each of valeric, isovaleric, and hexanoic acids. Preferably, the mixture of $C_4$ to $C_6$ monocarboxylic acid is composed principally of butyric acid, isobutyric acid, or mixtures of butyric and isobutyric acid together with a minor proportion of one or two other monocarboxylic acids, such as valeric, isovaleric, and hexanoic acids.

It has been discovered that molar equivalent quantities of salts of the organic acids provide comparable results to the organic acids. This discovery permits the formulation as a dry mixture of a fermentation compensator composition containing both the amino acids and the organic acids in salt form. This dry mixture can be readily transported, stored, and blended either with the baking flour, or with the dough as it is prepared. For this purpose, water-soluble acid salts can be used, such as the alkali and alkaline earth metal salts of the organic acids. Preferably, either the sodium, potassium, or calcium salts are used. For example, sodium acetate and calcium lactate may be used as the principal organic acid component together with a minor proportion of the sodium salts of the $C_4$ to $C_6$ monocarboxylic acids, such as sodium butyrate, isobutyrate, valerate, isovalerate, and hexanoate.

In accordance with the present invention, a fermentation compensator composition for admixture with a flour yeast dough can be prepared in the form of a dry powder which consists essentially of substantially completely hydrolyzed wheat gluten protein providing a mixture of the amino acids thereof and a mixture of food acceptable organic acid salts, the principal organic acid salt component being water soluble food acceptable salts of acetic acid, lactic acid, and mixtures thereof. From 1 to 50 parts by weight of the mixture of organic acid salts can be present per 100 parts of the mixture of amino acids. Preferably, from 5 to 25 parts by weight of the mixture of organic acid salts are used per 100 parts of the mixture of amino acids. In a desirable formulation, the organic acid salts are composed from 60 to 95 mole percent of a mixture of acetic and lactic acid salts together with 5 to 40 mole percent of monocarboxylic acid salts containing from 4 to 6 carbons. It is believed that the optimum formulation should contain from 20 to 80 parts by weight of the mixture of organic acid salts per 100 parts of the mixture of amino acids, and that the mixture of organic acids should be composed of from 70 to 90 mole percent of a mixture of acetic and lactic acid salts together with 10 to 30 mole percent of a mixture of monocarboxylic acid salts containing from 4 to 6 carbon atoms, and at least three different ones of the monocarboxylic acids being present. As previously indicated, the organic acid salts are preferably either the sodium, potassium, or calcium salts.

A flour composition ready for use in preparing yeast-raised products without prefermentation can be prepared by dry blending the wheat gluten hyrolyzate and the mixture of organic acid salts with the baking flour. Usually, the baking flour will be wheat flour, or wheat flour in admixture with a minor proportion of rye flour. The amounts of the mixture of amino acids and the organic acids to be incorporated in the flour correspond with those previously described for practicing the method of this invention, the amounts previously given being on a flour weight basis. For example, the flour composition my contain the mixture of individual gluten amino acids in an amount of 0.02 to 0.20%, or preferably 0.03 to 0.15%, based on the weight of the flour (14% M.B.). The organic acid mixture can be present in an amount providing from 1 to $10 \times 10^{-4}$ moles of total acid salts, or preferably 2 to $9 \times 10^{-4}$ moles, per each 700 grams of flour (14% M.B.).

The composition of the organic acid mixture can be as previously indicated. For example, from 60 to 95 mole % of the mixture can comprise acetic and lactic acid salts together with from 5 to 40 mole % of $C_4$ to $C_6$ monocarboxylic acid salts.

In a desirable embodiment, the complete hydrolyzate of wheat gluten protein is incorporated in the flour composition in an amount of 0.03 to 0.15% by weight together with a mixture of organic acid salts providing from 2 to $9 \times 10^{-4}$ moles of total acid salts per each 700 grams flour, and the organic acid salt mixture contains from 70 to 90% on a molar basis of a mixture of acetic and lactic acid salts together with 10 to 30 mole % of monocarboxylic acid salts containing from 4 to 6 carbons, at least 3 different ones of the $C_4$ to $C_6$ monocarboxylic salts being present. These salts may be either the sodium, potassium, or calcium salts.

EXPERIMENTAL DATA

Test formulas, physical properties, flavor properties, and comparative experimental data, as set out below, demonstrate the scientific basis of this invention.

| | Formulas (wt. % on Flour) | |
|---|---|---|
| Ingredients | 4-Hour Fermentation[5] | No-Time Fermentation[6] |
| Wheat Flour[1] | 100.0 | 100.0 |
| Commercial Yeast | 2.5 | 2.5 |
| Sucrose | 4.0 | 4.0 |
| NaCl | 2.0 | 2.0 |
| Malted Wheat Flour | 0.5 | 0.5 |

-Continued

| | Formulas (wt. % on Flour) | |
|---|---|---|
| Ingredients | 4-Hour Fermentation[5] | No-Time Fermentation[6] |
| Shortening | 3.5 | 3.0 |
| Yeast Food & Oxidant[2] | 0.5 | 0.0 |
| Dough Conditioner[3] | 0.5 | 0.5 |
| Oxidant[4] | 0.0 | 0.006 |
| Water | 65.0 | 65.0 |

[1] Expressed as 14% M.B. (moisture basis)
[2] "Arkady" yeast food & oxidant (Standard Brands)
[3] Sodium-2-stearoyl-lactylate
[4] 1:3 pot. iodate/pot. bromate
[5] The fermentation was carried out by allowing the partially mixed sponge to set for 4 hours at 86°F and 90% relative humidity, followed by the usual steps of panning, proofing, and baking.
[6] The procedure was the same except that the 4-hour fermentation was omitted, and the organic acids or salts therof were added when the dough was mixed together with the wheat gluten hydrolyzate, in the amounts specified in the following tables.

The quality characteristics studied, comprising physical properties of the bread, included the following:

Break and Shred: When dough is placed in an oven at elevated temperatue, the dough expands rather quickly forming a Break and Shred on both or single sides at the pan edge. It is scored visually with a maximum score of 10. A large smooth Break and Shred indicates good gas retention during initial minutes in the oven.

Symmetry: Symmetry is scored visually using 10 as maximum or optimum. A symmetrical loaf of bread is uniform, large and bold.

Crust Color: Crust color is scored visually with an optimum color assigned 10 points. If the loaf has a pale crust or is too dark (suggesting a burned flavor) the crust color is scored downward.

Texture: Texture scoring refers to the bread crumb feel. A maximum of 10 suggests an optimum texture. This type of texture should be soft and resilient to the touch.

Grain: Grain refers to the usual appearance of the bread crumb. It is given a maximum value of 10 for optimum. The grain of a good type bread is expected to be fine, and uniform. The cell walls are expected to be lacylike.

Crumb Color: This refers to color of the bread crumb. It too is scored a maximum of 10 for optimum color. Optimum color is expected to be creamy white in color. It is influenced by the presence of natural pigments and the fineness of the crumb grain and its ability to reflect white light.

As indicated, the scoring of the above properties, except for volume, was on a scale of 1 to 10 with 10 representing the optimum for the particular property. Each score in the table represents the average of 2 observations of two baking experts. The average was rounded to the nearest whole number. The average scores for the six observed properties, other than volume, were added to provide a total score, a score of 60 being the maximum.

Loaf volume was measured shortly after removal of the bread from the oven by rape seed displacement. The loaf volume was expressed in cubic centimeters per pound of bread. Greater loaf volume indicates better gas retention by the gluten protein during initial stages of the baking process in the oven.

The organoleptic analysis of flavor reception by the consumer involved a triangle comparison test for sweetness, sourness, bread aroma, and overall bread flavor. The scoring was on a scale of 1 to 3 with 3 representing the optimum. Each of the individual scores represent the average of 16 observations by semi-trained consumers. The flavor properties are defined as follows:

Bread Sweetness: Is one of the basic tasts detected by the taste buds located in the tongue. Sweetness in organoleptic testing of bread is associated with sugar like compounds. The consumer desires some degree of sweetness but recognizes that bread is relatively unsweet compared to sweetness of sucrose or other sugars.

Bread Sources: Is also one of the basic tastes detected by the taste buds. Since bread has always been made with fermentation, the consumer has grown accustomed to the acid flavor, though slight, associated with bread.

Bread Aroma: Aroma is the sensation of the consumer as they smell fresh bread. It is due to a complex series of alcohols, acids, carbonyl and ester compounds. The aroma of these gaseous compounds is detected by the olfactory sense organs located in the nasal passage of each consumer.

Over-All Bread Flavor: This is a general ranking of the bread by the consumer preference. It involves taste and smell senses as well as cutaneous sensations of the consumer as they eat bread. This factor above all others is a combination of psychological and physiological reactions of the consumer.

The purified low carbohydrate glute employed in the experiments was hydrolyzed in 4N hydrochloric acid. After the hydrolysis to free amino acids was complete, the excess hydrochloric acid was neutralized with sodium hydroxide. The sodium chloride thus formed was not removed. The gluten hydrolyzate consisted of amino acids expressed as protein ($N \times 5.7$) amounting to 38.0%, 40% NaCl, 15%, moisture and 4% of unaccounted material such as sugars. The polypeptide content was negligible.

For use in the experiments, solutions of organic acids and organic acid salts were prepared as follows:

| Organic Acid Solution | | |
|---|---|---|
| Acid | mg/100 cc. | moles/cc |
| Lactic Acid | 108.00 | $1.2 \times 10^{-5}$ |
| Acetic Acid | 24.00 | $4.0 \times 10^{-6}$ |
| Butyric Acid | 3.52 | $4.0 \times 10^{-7}$ |
| Valeric Acid | 1.43 | $1.4 \times 10^{-7}$ |
| Hexanoic Acid | 1.63 | $1.4 \times 10^{-7}$ |
| Totals | 139.58 | $1.67 \times 10^{-5}$ |

| Organic Acid Salt Solution | | |
|---|---|---|
| Acid Salt | mg/100 cc. | moles/cc |
| Ca-lactate | 130.90 | $1.2 \times 10^{-5}$ |
| Na-acetate | 32.81 | $4.0 \times 10^{-6}$ |
| Na-butyrate | 4.40 | $4.0 \times 10^{-7}$ |
| Na-isobutyrate | 4.40 | $4.0 \times 10^{-7}$ |
| Na-valerate | 1.74 | $1.4 \times 10^{-7}$ |
| Na-isovalerate | 1.74 | $1.4 \times 10^{-7}$ |
| Na-hexanoate | 1.93 | $1.4 \times 10^{-7}$ |
| Totals | 177.92 | $1.72 \times 10^{-5}$ |

In adding the organic acids and organic acid salts to the dough, the molar concentrations based on 700 grams of flour were achieved as follows:

| Molar concentration Moles/700 g. flour* | Organic Acid Solution (cc) | Organic Acid Salt Solution (cc) |
|---|---|---|
| $8.5 \times 10^{-5}$ | 5.096 | 4.94 |
| $1.7 \times 10^{-4}$ | 10.19 | 9.88 |
| $2.4 \times 10^{-4}$ | 14.39 | 13.95 |
| $3.4 \times 10^{-4}$ | 20.38 | 19.77 |
| $5.1 \times 10^{-4}$ | 30.58 | 29.65 |
| $6.8 \times 10^{-4}$ | 40.77 | 39.54 |
| $8.5 \times 10^{-4}$ | 50.96 | 49.42 |
| $1.0 \times 10^{-3}$ | 59.55 | 58.14 |
| $1.2 \times 10^{-3}$ | 71.94 | 69.77 |
| $1.4 \times 10^{-3}$ | 83.93 | 81.40 |

*14% M.B.

TABLE 1

Effect of Hydrolyzed Gluten on Bread Properties

| Fermentation | | 4 Hrs.[3] | | None | |
|---|---|---|---|---|---|
| Hydrolyzed Gluten[1] wt. %/flour[5] | | 0.0 | 0.0 | 0.2 | 0.4 |
| Amino Acids[1] wt. %/flour[5] | | 0.0 | 0.0 | 0.070 | 0.15 |
| Physical Properties[4] | Max. Score[2] | | | | |
| Break and Shred | (10) | 9 | 6 | 6 | 8 |
| Symmetry | (10) | 9 | 7 | 7 | 8 |
| Crust Color | (10) | 9 | 6 | 8 | 10 |
| Texture | (10) | 9 | 7 | 7 | 7 |
| Grain | (10) | 8 | 7 | 7 | 7 |
| Crumb Color | (10) | 10 | 10 | 10 | 7 |
| Totals | (60) | 54 | 43 | 45 | 47 |
| Volume | (cc) | 3163 | 3150 | 3163 | 3200 |
| Flavor Properties[4] | | | | | |
| Sweetness | (3) | 2.29 | 2.00 | 1.71 | 1.71 |
| Sourness | (3) | 2.06 | 2.06 | 1.71 | 1.94 |
| Aroma | (3) | 2.18 | 1.94 | 1.95 | 1.68 |
| Overall Flavor | (3) | 2.18 | 1.88 | 1.97 | 1.97 |

| Fermentation | | None | | | | |
|---|---|---|---|---|---|---|
| Hydrolyzed Gluten[1] | wt.%/flour[5] | 0.6 | 0.8 | 1.0 | 1.5 | 2.0 |
| Amino Acids | wt.%/flour[5] | 0.23 | 0.3 | 0.38 | 0.57 | 0.76 |
| Physical Properties[4] | Max. Score[2] | | | | | |
| Break & Shred | (10) | 8 | 7 | 7 | 7 | 7 |
| Symmetry | (10) | 8 | 7 | 7 | 8 | 8 |
| Crust Color | (10) | 10 | 8 | 8 | 7* | 6* |
| Texture | (10) | 7 | 7 | 7 | 7 | 6 |
| Grain | (10) | 6 | 7 | 7 | 7 | 6 |
| Crumb Color | (10) | 6 | 8 | 8 | 8 | 8 |
| Total | (60) | 45 | 44 | 44 | 44 | 43 |
| Volume | (cc) | 3185 | 3137 | 3125 | 3052 | 3000 |
| Flavor Properties[4] | | | | | | |
| Sweetness | (3) | 1.77 | 1.71 | 1.35 | 1.88 | 1.35 |
| Sourness | (3) | 1.65 | 2.08 | 2.41 | 2.12 | 2.53 |
| Aroma | (3) | 1.59** | 1.88** | 1.82** | 1.76** | 1.59** |
| Overall Flavor | (3) | 1.49** | 1.82** | 1.52** | 1.94** | 1.47** |

*Too dark
**Bitter-cheesy flavor and aroma, strong but unacceptable.
[1]38% amino acids (N × 5.7), 44% NaCl, 15% moisture, 3% unanalyzed non-protein.
[2]The maximum (optimum) score was 10 for Physical Properties on a scale of 1 to 10, and the maximum (optimum) score for Flavor Properties was 3, on a scale of 1 to 3.
[3]Standard sponge dough using 4-hour sponge fermentation.
[4]Defined above.
[5]On a 14% moisture basis (14% M.B.). See Method 82-23, Cereal Laboratory Methods, (7th ed., 1962, A.A.C.C.).

TABLE 2

Effect of Hydrolyzed Gluten and Organic Acid Concentration on Bread Properties
(0.2% Hydrolyzed Gluten, 0.076% Amino Acids)

| Conc.organic Acids[4] (moles/700 g.flour) | | Sponge Dough[2] none | No Fermentation | |
|---|---|---|---|---|
| | | | $1.7 \times 10^{-4}$ | $3.4 \times 10^{-4}$ |
| Physical Properties[1] | Max.Score[3] | | | |
| Break & Shred | (10) | 10 | 9 | 9 |
| Symmetry | (10) | 10 | 9 | 9 |
| Crust Color | (10) | 8 | 9 | 9 |
| Texture | (10) | 8 | 7 | 8 |
| Grain | (10) | 8 | 7 | 8 |
| Crumb Color | (10) | 10 | 10 | 10 |
| Total | (60) | 54 | 51 | 53 |
| Volume | (cc) | 3100 | 3025 | 2900 |
| Flavor Properties[1] | | | | |
| Sweetness | (3) | 1.94 | 1.35 | 2.18 |
| Sourness | (3) | 1.94 | 2.12 | 1.65 |

TABLE 2 – Continued

Effect of Hydrolyzed Gluten and Organic Acid Concentration on Bread Properties
(0.2% Hydrolyzed Gluten, 0.076% Amino Acids)

| Conc.organic Acids[4] (moles/700 g.flour) | | Sponge Dough[2] none | No Fermentation | |
|---|---|---|---|---|
| | | | $1.7 \times 10^{-4}$ | $3.4 \times 10^{-4}$ |
| Aroma | (3) | 1.82 | 2.53 | 1.65 |
| Overall Flavor | (3) | 1.83 | 1.88 | 1.82 |

| Conc. Organic Acids (moles/700 g. flour) | | No Fermentation | | | |
|---|---|---|---|---|---|
| | | $5.1 \times 10^{-4}$ | $6.8 \times 10^{-4}$ | $8.5 \times 10^{-4}$ | $1.0 \times 10^{-3}$ |
| Physical Properties[1] | Max. Score[3] | | | | |
| Break & Shred | (10) | 9 | 8 | 10 | 9 |
| Symmetry | (10) | 9 | 9 | 10 | 9 |
| Crust Color | (10) | 9 | 9 | 10 | 9 |
| Texture | (10) | 8 | 7 | 9 | 7 |
| Grain | (10) | 8 | 8 | 9 | 7 |
| Crumb Color | (10) | 10 | 10 | 10 | 8 |
| Total | (60) | 53 | 51 | 58 | 49 |
| Volume | (cc) | 3000 | 2950 | 3025 | 3125 |
| Flavor Properties[1] | | | | | |
| Sweetness | (3) | 2.12 | 1.65 | 2.25 | 1.65 |
| Sourness | (3) | 1.88 | 1.82 | 1.50 | 2.12 |
| Aroma | (3) | 2.12 | 1.95 | 1.94 | 2.06 |
| Overall Flavor | (3) | 2.06 | 2.00 | 2.19 | 2.06 |

[1] As defined above.
[2] Standard sponge dough with 4 hour fermentation, and with no amino acids or organic acids added.
[3] Scales of 1 to 10 for Physical Properties and 1 to 3 for Flavor Properties with maximum scores of 10 and 3 representing optimums.
[4] On a 14% moisture basis (14% M.B.)

TABLE 3

Effect of Hydrolyzed Gluten and Organic Acid Salt Concentration on Bread Properties
(0.2% Hydrolyzed Gluten, 0.076% Amino Acids)

| Conc. Organic Acids (moles/700 g. flour)[4] | | Sponge Dough[2] none | No Fermentation | | | |
|---|---|---|---|---|---|---|
| | | | $8.5 \times 10^{-5}$ | $1.7 \times 10^{-4}$ | $2.4 \times 10^{-4}$ | $5.1 \times 10^{-4}$ |
| Physical Properties[1] | Max. Score[3] | | | | | |
| Break & Shred | (10) | 10 | 9 | 8 | 10 | 10 |
| Symmetry | (10) | 10 | 8 | 8 | 10 | 10 |
| Crust Color | (10) | 8 | 9 | 9 | 9 | 9 |
| Texture | (10) | 9 | 7 | 6 | 8 | 8 |
| Grain | (10) | 8 | 8 | 7 | 8 | 8 |
| Crumb Color | (10) | 10 | 10 | 9 | 10 | 10 |
| Total | (60) | 55 | 51 | 47 | 55 | 55 |
| Volume | (cc) | 2925 | 3075 | 2925 | 3200 | 3225 |
| Flavor Properties[1] | | | | | | |
| Sweetness | (3) | 2.06 | 1.94 | 2.00 | 2.12 | 2.00 |
| Sourness | (3) | 2.18 | 1.88 | 2.18 | 2.18 | 1.88 |
| Aroma | (3) | 2.24 | 2.08 | 1.88 | 2.29 | 2.06 |
| Overall Flavor | (3) | 2.06 | 2.18 | 2.18 | 2.20 | 2.25 |

(1) (2) and (3) as Table 2

| Conc. Organic Acids (moles/700 g. flour)[4] | | none | $6.8 \times 10^{-4}$ | $8.5 \times 10^{-4}$ | $1.0 \times 10^{-3}$ | $1.2 \times 10^{-3}$ | $1.4 \times 10^{-3}$ |
|---|---|---|---|---|---|---|---|
| Physical Properties[1] | Max.Score[3] | | | | | | |
| Break & Shred | (10) | | 10 | 9 | 9 | 8 | 8 |
| Symmetry | (10) | | 10 | 10 | 10 | 8 | 8 |
| Crust Color | (10) | | 10 | 10 | 10 | 7 | 7 |
| Texture | (10) | | 10 | 9 | 9 | 7 | 7 |
| Grain | (10) | | 10 | 9 | 9 | 7 | 7 |
| Crumb Color | (10) | | 10 | 10 | 10 | 10 | 10 |
| Total | (60) | | 60 | 57 | 57 | 56 | 47 |
| Volume | (cc) | | 3250 | 3200 | 3000 | 3100 | 3000 |
| Flavor Properties[1] | | | | | | | |
| Sweetness | (3) | | 2.24 | 2.29 | 1.82 | 1.88 | 1.71 |
| Sourness | (3) | | 1.59 | 1.82 | 1.94 | 2.19 | 1.68 |
| Aroma | (3) | | 2.18 | 2.00 | 2.12 | 1.75 | 1.94 |
| Overall Flavor | (3) | | 2.47 | 2.06 | 1.88 | 2.00 | 2.00 |

TABLE 4

Effect of Hydrolyzed Gluten and $6.8 \times 10^{-4}$ Moles
Organic Acid Salts per 700 Grams Flour on Bread Properties

| Hydrolyzed Gluten (38%)[1] | wt%/flour[4] | 0.05 | 0.1 | 0.2 |
|---|---|---|---|---|
| Amino Acids | wt%/flour[4] | 0.05 | 0.1 | 0.2 |

| Physical Properties[2] | Max.Score[3] | | | |
|---|---|---|---|---|
| Symmetry | (10) | 9 | 9 | 9 |
| Crust Color | (10) | 8 | 9 | 10 |
| Texture | (10) | 8 | 8 | 9 |
| Grain | (10) | 7 | 8 | 9 |
| Crumb Color | (10) | 10 | 10 | 10 |
| Total | (60) | 52 | 54 | 57 |
| Volume | (cc) | 3100 | 3125 | 3000 |

| Flavor Properties[2] | | | | |
|---|---|---|---|---|
| Sweetness | (3) | 1.77 | 1.94 | 1.82 |
| Sourness | (3) | 1.82 | 1.82 | 1.94 |
| Aroma | (3) | 2.06 | 1.88 | 2.12 |
| Overall Flavor | (3) | 2.06 | 1.82 | 1.94 |
| Hydrolyzed Gluten (38%)[1] | wt%/flour[4] | 0.3 | 0.4 | 0.6 |
| Amino Acids | | 0.11 | 0.15 | 0.23 |

| Physical Properties[2] | Max. Score[3] | | | |
|---|---|---|---|---|
| Break & Shred | (10) | 8 | 10 | 10 |
| Symmetry | (10) | 8 | 10 | 10 |
| Crust Color | (10) | 10 | 9 | 9 |
| Texture | (10) | 9 | 8 | 8 |
| Grain | (10) | 9 | 7 | 7 |
| Crumb Color | (10) | 10 | 10 | 10 |
| Total | (60) | 54 | 54 | 54 |
| Volume | (cc) | 3150 | 3100 | 3150 |

| Flavor Properties | | | | |
|---|---|---|---|---|
| Sweetness | (3) | 1.59 | 1.53 | 1.82 |
| Sourness | (3) | 2.47 | 2.12 | 1.24 |
| Aroma | (3) | 2.00 | 1.77 | 1.77 |
| Overall Flavor | (3) | 1.77 | 1.77 | 1.77 |

[1]38% amino acids (N × 5.7), 44% NaCl, 15% moisture, 3% unanalyzed non-protein
[2]As defined above.
[3]Scales of 1 to 10 for Physical Properties and 1 to 3 for Flavor Properties with maximum scores of 10 and 3 representing optimums.
[4]As defined above.

The following examples are included to facilitate commercial practice of the invention in various practical embodiments thereof.

EXAMPLE I

In a preferred mode of practicing the present invention, a fermentation compensator may be prepared as a dry mix for addition to the dough as it is prepared or for premixing with the flour, according to the following dry-mix formula.

| Ingredient | Wt | Grams per 700 grams % | Moles/700 g flour* |
|---|---|---|---|
| Gluten Hydrolyzate | 50.0 | 1.4 | — |
| Amino Acids | 19.0 | .533 | — |
| Sodium Chloride | 22.0 | .616 | — |
| Moisture | 7.5 | .210 | — |
| Undetermined | 1.5 | .042 | — |
| Na-acetate | 0.88 | .0246 | $3.0 \times 10^{-4}$ |
| Ca-lactate | 1.250 | .0349 | $3.2 \times 10^{-4}$ |
| Na-butyrate | 0.082 | .0023 | $2.09 \times 10^{-5}$ |
| Na-isobutyrate | 0.082 | .0023 | $2.09 \times 10^{-5}$ |
| Na-valerate | 0.032 | .0009 | $7.3 \times 10^{-6}$ |
| Na-isovalerate | 0.032 | .0009 | $7.3 \times 10^{-6}$ |
| Na-hexanoate | 0.032 | .0009 | $6.6 \times 10^{-6}$ |
| Starch | 47.61 | 1.331 | |
| Wt. Totals | 100.00 | 2.8 | |
| Total Moles Acid Salts | | | $6.8 \times 10^{-4}$ |

*At 0.4% dry mix to 14% M.B. flour

In the manufacture of most yeast-raised products, the dry-mix formula as set out above may be advantageously employed in the amount of 0.4% by weight based on the dry weight of the flour. This results in 0.076% total amino acids based on the flour, and $6.8 \times 10^{-4}$ total organic acid salts per each 700 grams flour. The moles of each organic acid salt are indicated above. The amounts of amino acids and organic acid salts are in accordance with the experimental results.

EXAMPLE II

In an alternate and less desirable mode of practicing the present invention, the $C_4$–$C_6$ acid salts are omitted. The fermentation compensator is prepared as dry mix as in Example I for addition to the dough as it is prepared or for premixing with the flour, according to the following formula.

| Ingredient | % | Moles/700 g Flour Using 0.4% Dry Mixture on Flour (14% M.B.) |
|---|---|---|
| Gluten Hydrolyzate | 50.0 | |
| Amino Acid (N × 5.7) | 19.0 | |
| NaCl | 22.0 | |
| Moisture | 7.5 | |
| Unaccounted Material | 1.5 | |
| Na-acetate | 0.88 | $3.0 \times 10^{-4}$ |
| Ca-lactate | 1.25 | $3.2 \times 10^{-4}$ |
| Diluent (starch) | 47.87 | |
| Total Acid Salts | 2.13 | $6.2 \times 10^{-4}$ |

EXAMPLE III

In practicing the present invention, the following formulas and procedures may be utilized:

Formula For White Pan Bread

| Ingredient | Wt. % | Wt. (lbs.) |
|---|---|---|
| Flour (14% M.B.) | 100 | 1000 |
| Compressed Yeast | 2.5 | 25 |
| Sugar | 4.0 | 40 |
| Salt | 2.0 | 20 |
| Shortening | 3.0 | 30 |
| Malted Wheat Flour | 0.50 | 5 |
| Dough Conditioner | 0.50 | 5 |
| Dry Mix of Example I | 0.2 – 0.4 | 2 – 4 |
| Water (Variable) | 65.0 | 650 |

Sponge Dough Procedures

Place all ingredients in mixer and mix dough to full development. Allow dough to rest in dough trough for 10–15 minutes before dividing into 18 ounce piece. Allow dough 5–10 minutes in overhead proofer before shaping and panning. Allow dough to proof (rise in pan) for 45–55 minutes at 100°–105°F. Bake dough for 18–21 minutes at 440°F.

Continuous Mix Bread Processes

To use the new invention in a continuous mix bread process, use the dry mix of Examples I or II at 0.2% to 0.4% concentration based on flour usage. The dry mix may be added at the brew stage or at the incorporation stage described below. All figures are based on percent of flour.

| STAGE I | STAGE II |
|---|---|
| Compressed Yeast, 2% | Sugar, 5% |
| Water ⅔ of 66%,80°F. | Salt 2% |
| Dry Mix, Example I, 0.2–0.4% | Malted Wheat Flour 0.5% |
| (Stir into homogeneous suspension and put on stream without fermentation holding time) | Oxidant 60–70 PPM |
| | Shortening 3% |
| | Dough Conditioner 0.5% |
| | Flour 100% |
| | Water ⅓ of 66% |

Stage III
Incorporator
↓
Dough Pump
↓
Developer Mixer
↓
Pan
↓
Proof (50–55 min., 100–101°F)
↓
Bake (18–20 min., 440°F)

In the continuous process used in most bakeries in the United States, the only basic change that needs to be made in using this new invention is to eliminate the brew fermentation time of usually 3 hours. Experience has shown that the brew can be made with 80% of the total water, 100% of the yeast (usually 2.0% based on flour weight) oxidant, (60–75 ppm, based on flour) and the dry mix of amino acids and organic acids blended in the customary fermentation brew tank. Instead of holding the brew at 85°F for 3 hours, the yeast suspension can be used directly. The remaining portion of the continuous process requires no change from that regularly used by the baker when using the conventional process.

Cracker Processes

Usually in commercial saltine cracker production, 80% of flour, 0.5% yeast based on total flour, and water approximately equal to 56% of the flour in the sponge is mixed into a stiff dough which is permitted to ferment at 86°F for 18 hours. At this point of manufacture, the remaining 20% of the flour, 0.75% of NaHCO$_3$, 10% shortening based on total flour, and the correct additional amount of water is added (viz. 56% on total flour), and the total dough remixed. After mixing, the dough is fermented for 6 more hours before placing in a hopper above a series of steel rolls which reduces the dough in several laps to the correct thickness. The band of dough is then cut into cracker squares or other desired shapes and baked in a long tunnel oven on a traveling belt. The temperature of baking starts at 425°F and rises to 550°F before again declining to 400°F. The baking process is about 3.5 minutes in total time. In the embodiment of this invention, the same process would be used except the sponge fermentation would be reduced to 1 hour, 0.3–0.4% of the fermentation compensator of Example I, 0.05 to 0.1% cysteine and 2% of lactose or gelatinized starch based on total flour weight would be added. The remaining remix and ingredients would be added to the sponge after 1 hour of fermentation and handled as is customery in cracker production. Only 10 minutes of relaxation time would be given the dough after the remix or cracker dough could be made as straight using a total of 1 hour of fermentation.

| Pizza Dough Process Formula | | |
|---|---|---|
| Formula | Wt. % | Wt. (lbs.) |
| Flour | 100 | 100 |
| Compressed Yeast | 0.5 | 0.5 |
| Shortening | 7.0 | 7.0 |
| Salt | 2.5 | 2.5 |
| Water | 55.0 | 55.0 |
| Dry Mix Compensator of Example I | 0.2–0.4 | 0.2–0.4 |

Pizza pie crust formulation and procedure is variable depending on the manufacture but all use from 4 to 12 hours of dough fermentation after given dough a relatively short mix. With the addition of the fermentation eliminator, satisfactory pizza shells can be produced with excellent flavor without any time allowed for fermentation.

| Sweet Dough Processes Formula | | |
|---|---|---|
| | Wt. % | Wt. (lbs.) |
| Flour | 100 | 100 |
| Compressed Yeast | 6.0 | 6.0 |
| Sugar | 11.0 | 11.0 |
| Salt | 2.0 | 2.0 |
| Shortening | 11.0 | 11.0 |
| Dry Skim Milk | 4.0 | 4.0 |
| Malted Wheat Flour | 0.5 | 0.5 |
| Dried Whole Eggs | 1.5 | 1.5 |
| Fermentation Compensator of Examples I or II | 0.2–0.4 | 0.2–0.4 |
| Oxidant (1:3 pot. iodate/pot. bromate) | 0.0045 | 0.0045 |
| Water | 60.0 | 60.0 |

All ingredients can be mixed at one mixer setting to optimum development of the dough. After mixing, allow 10 minutes of relaxation time before cutting and shaping into desired shapes and forms. After panning pieces, allow 40-45 minutes proof at 105°F before baking for 12 to 15 minutes at 425°F.

General Procedures

In practicing the present invention, it will be understood that the flour and/or flour-dough-mix is advantageously utilized at an essentially optimized oxidation-reduction potential. Under existing practices, the flour may be oxidized by the flour miller using reagents such as chlorine dioxide, acetone peroxide, etc. In addition, it is common practice in preparing for flour dough products to add from 0.001 to 0.003% solid oxidants, such as potassium bromate, potassium iodate, or mixtures thereof. The amount required for optimum redox potential will vary somewhat with the particular flour and with the extent to which the flour has been subjected to preoxidation. Oxidants may be combined with yeast foods, for example the "Arkady" yeast food product of Standard Brands, referred to above, when used at a level of 0.5% based on the flour is estimated to provide 0.002% potassium bromate, which is believed to be essentially optimum with a 4-hour fermentation.

In practicing the present invention using no-fermentation time doughs, the optimum amount of oxidants is also advantageously employed. Usually, where a solid oxidant is used, such as potassium bromate and/or iodate, the amount to be employed will range from about 0.004 to 0.0075% by weight based on the flour. Equivalent amounts of other oxidants can be used. The adjustment of the oxidants to achieve optimum redox potential is a well known procedure in bakeries, and is determined in relation to the particular flour. For example, in the no-fermentation time for the flour used in the tests reported above under "Experimental Data", a 1:3 ratio of potassium iodate and potassium bromate at a level of 0.006% based on the flour was used essentially optimum. All standard fermentation time and all no-fermentation time runs were therefore made at essentially optimized oxidant levels, thereby permitting comparison of the effects of the amino acids and organic acids on physical properties at substantially optimum redox potentials.

In the foregoing specification and appended claims, the content of amino acids is specified on the basis of weight percent based on the flour. To those skilled in the bread baking art, it will be understood that such weight determinations can be made in terms of standard analytical procedures. For example, a suitable procedure for determining gluten amino acids is set out in Method 46–10, *Cereal Laboratory Methods*, (7th ed., 1962, AACC). Corresponding procedures are published elsewhere. For pure gluten protein, it is known that each 100 weight units contains 17.54 weight units of nitrogen. Accordingly, if the milligrams of nitrogen in a given sample are determined by a standard method, such as the Kjeldahl nitrogen determination procedure for measuring evolved ammonia, multiplying the milligrams of nitrogen by 5.7 (100 divided by 17.54) will give the milligrams of gluten amino acids. This weight of amino acids can be converted to a weight percent by dividing the milligrams of amino acids by the milligrams of the sample and multiplying by 100%. In terms of the ranges as expressed in the claims, the determined weight of amino acids in the hydrolyzate can be used to calculate the amount to be added to obtain the stated ranges based on percent amino acids to the flour. In making these computations, it is assumed that substantially all of the gluten protein has been hydrolyzed to individual amino acids. If there is any question of the completeness of the hydrolysis, the sample can be checked by standard procedures for determining conversion of protein to amino acids, such as with automatic amino acid analyzer. In the experimental work relating to the present invention, a Beckman amino acid analyzer of the column chromatographic type was used. The amino acid hydrolyzates were shown to be substantially completely converted to individual amino acids, at least 92 to 95% of the protein being accounted for as individual amino acids and negligible residual protein being found.

Other Processes

Other baked product formulas can be adopted with good success. These include rye bread, whole wheat breads, French bread, Vienna bread and dinner rolls. In all formulations 0.2–0.4% based on weight of flour of the fermentation compensator, (Examples I or II) have been used and the fermentation step has been eliminated. The quality of the products has been high.

Other Gluten Amino Acid Sources

In the foregoing specification, particular reference has been made to the amino acid mixture obtained by a substantially complete hydrolysis of wheat gluten protein. However, certain of the advantages of the present invention can be obtained by substituting corresponding hydrolyzates of other gluten proteins on the equal weight basis at the ranges stated above for wheat gluten amino acids. Such other gluten or cereal protein sources are preferably also purified before hydrolysis to remove most of the carbohydrates. Commercially, rye gluten is not normally available in purified form. Purified soybean protein is available, and can be hydrolyzed to produce a mixture of the individual amino acids. Hydrolyzates of gluten other than wheat gluten may have been disadvantages of adding different or additional flavors such as a rye flavor or a soybean flavor, which may not be acceptable to the consumers. Consequently, the total combination of physical properties and flavor properties will not be as desirable as with wheat gluten amino acids. Commercial utilization may therefore be limited to special dough mixes, such as dough mixes containing rye flour to which rye gluten amino acids may be added, or dough mixes containing soybean flour, to which soybean protein amino acids may be added in combination with the organic acids or salts thereof as described above with respect to wheat gluten amino acids.

Flour Basis

In the foregoing specification and in the appended claims, whenever weight or molar amounts of ingredients are expressed as based on the "flour", it should be understood that a standard 14% moisture basis flour is designated, as is conventional in the U.S. baking industry. When the actual moisture content of a particular flour varies from the assumed 14% moisture basis reference flour, a conversion should be made. Published tables are available for converting the actual moisture content of a flour to the 14% reference standard, usually designated as "14% M.B.". One reference showing tables for such conversion is: Method 82-23, *Cereal Laboratory Methods* (7th ed., 1962 AACC).

I claim:

1. A fermentation compensator compositin for admixture with a flour yeast dough mix, said composition being in the form of a dry powder and consisting essentially of substantially completely hydrolyzed wheat gluten protein providing a mixture of the individual amino acids thereof and a mixture of food acceptable organic acid salts including a principal organic acid salt component selected from the water soluble food acceptable salts of acetic acid, lactic acid, and mixtures thereof, from 1 to 50 parts by weight of said mixture of organic acid salts being present per 100 parts of said mixture of amino acids.

2. The composition of claim 1 wherein from 5 to 25 parts by weight of said mixture of organic acid salts are present per 100 parts of said mixture of amino acids.

3. The composition of claim 1 in which said organic acid salts are composed of from 70 to 95 mole % of a mixture of acetic and lactic acid salts together with 5 to 30 mole % of monocarboxylic acid salts containing from 4 to 6 carbons.

4. The composition of claim 1 in which from 5 to 25 parts by weight of said mixture of organic acid salts are present per 100 parts of said mixture of amino acids, said mixture of organic acid salts being composed of from 70 to 95 mole % of a mixture of acetic and lactic acid salts together with 5 to 30 mole % of a mixture of monocarboxylic acid salts containing from 4 to 6 carbons, at least three different ones of said $C_4$ to $C_6$ monocarboxylic acids being present.

5. A flour composition for baking yeast-raised products, comprising baking flour in admixture with a hydrolyzate of wheat gluten protein composed essentially of a mixture of the individual amino acids thereof, and with a mixture of food acceptable organic acid salts including a principal organic acid salt component selected from the water soluble food acceptable salts of acetic acid, lactic acid, and mixtures thereof, said amino acid mixture being present in an amount of from 0.02 to 0.20% by weight based on the weight of the flour, and said organic acid mixture being present in an amount providing from 1 to $10 \times 10^{-4}$ moles total acid salts per each 700 grams flour.

6. The flour composition of claim 5 in which said amino acid mixture is present in amount of from 0.03 to 0.15% by weight based on the weight of the flour, and said organic acid mixture is present in an amount providing from 2 to $9 \times 10^{-4}$ moles of total acid salts per each 700 grams of flour.

7. The flour composition of claim 5 in which said organic acid salt mixture contains from 80 to 93% on a molar basis of acetic and lactic acid salts together with 7 to 20 mole % of monocarboxylic acid salts containing from 4 to 6 carbons.

8. The flour composition of claim 5 in which said organic acid salts are selected from the sodium, potassium, and calcium salts thereof, said amino acid mixture is present in an amount of from 0.03 to 0.15% by weight based on the weight of the flour, and said mixture of organic acid salts is present in an amount providing from 2 to $9 \times 10^{-4}$ moles total acid salts per each 700 grams of flour, said organic acid salt mixture containing from 80 to 93% on a molar basis of a mixture of acetic and lactic acid salts together with 7 to 20 mole % of monocarboxylic acid salts containing from 4 to 6 carbons, and at least three different ones of said $C_4$ to $C_6$ monocarboxylic acid salts are present.

9. A process for manufacturing yeast-raised baked dough products of the kind involving a standard fermentation stage for the flour yeast dough mix after preparation thereof of from 2 to 24 hours before said dough is formed into bodies of a size and shape for baking with brown crust formation, whrein the improvement comprises reducing or eliminating said fermentation stage while achieving at least as good flavor and physical properties in the baked products by the step of incorporating in said dough mix as it is prepared a hydrolyzate of wheat gluten protein composed essentially of a mixture of the individual amino acids thereof together with a mixture of food acceptable organic acids including a principal organic acid component selected from the group consisting of acetic acid, lactic acid, and mixtures thereof, said organic acids being in a form selected from said organic acids and sodium, potassium, and calcium salts thereof, said amino acid mixture being incorporated in an amount of from 0.02 to 0.20% by weight based on the weight of the flour in said mix, and providing from 1 to $10 \times 10^{-4}$ moles total acid per each 700 grams of said flour in said mix.

10. The process improvement of claim 9 wherein said amino acid mixture is incorporated in an amount of from 0.03 to 0.15% by weight based on the weight of the flour.

11. The process improvement of claim 9 wherein said organic acid mixture is incorporated in an amount providing from 2 to $9 \times 10^{-4}$ moles total acid per each 700 grams of flour in said mix.

12. The process improvement of claim 9 wherein said organic mixture contains from 70 to 95% on a molar basis of a mixture of acetic and lactic acids together with 5 to 30 mole % of monocarboxylic acids containing from 4 to 6 carbons.

13. The process improvement of claim 11 wherein said $C_4$ to $C_6$ monocarboxylic acids are present in an amount of 7 to 20 mole % of said organic acid mixture, and at least three different ones of said monocarboxylic acids are present.

14. A process of manufacturing bread from a flour yeast dough mix of the kind involving a fermentation stage of from 3 to 4 hours after the preparation of the mix and before panning and proofing of the dough, wherein the improvement comprises reducing or eliminating said fermentation stage while achieving at least as good flavor and physical properties in the baked break by the step of incorporating in said dough mix as it is prepared a hydrolyzate of wheat gluten protein composed essentially of a mixture of the individual amino acids thereof together with a mixture of food acceptable organic acids including a principal organic acid component selected from the group consisting of acetic acid, lactic acid, and mixtures thereof, said organic acids being in a form selected from the free organic acids and the sodium, potassium, and calcium salts thereof, said amino acid mixture being incorporated in an amount of from 0.02 to 0.20% by weight based on the weight of the flour in said mix, and said organic acid mixture being incorporated in an amount providing from 1 to $10 \times 10^{-4}$ moles total acid per each 700 grams of flour in said mix, said improvement being further characterized in that said dough mix is formed into loaves ready for proofing in less than one hour after preparation thereof.

15. The process improvement of claim 14 wherein said amino acid mixture is incorporated in an amount of from 0.03 to 0.15% by weight based on the weight of the flour.

16. The process improvement of claim 14 wherein said organic acid mixture is incorporated in an amount providing from 2 to $9 \times 10^{-4}$ moles total acid per each 700 grams flour in said mix.

17. The process improvement of claim 14 wherein said organic acid mixture contains from 70 to 95% on a molar basis of a mixture of acetic and lactic acids together with 5 to 30 mole % of monocarboxylic acids containing from 4 to 6 carbons.

18. The process improvement of claim 14 wherein said $C_4$ to $C_6$ monocarboxylic acids are present in an amount of 7 to 20 mole % of said organic acid mixture, and at least three different ones of said monocarboxylic acids are present.

* * * * *